Aug. 18, 1936.  C. J. HARTSELL  2,051,336
SEED HARVESTING ATTACHMENT FOR MOWING MACHINES
Filed March 5, 1936  4 Sheets—Sheet 1
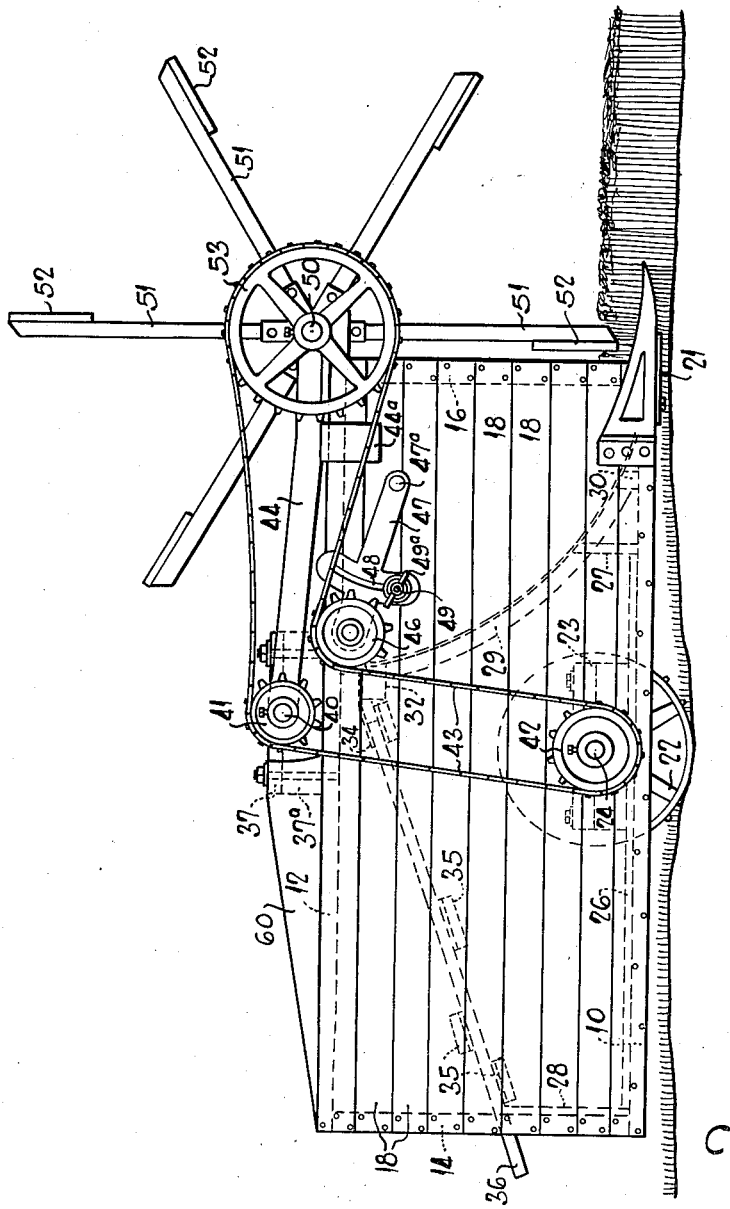
CHARLIE J. HARTSELL
Inventor
By
Attorney Aug. 18, 1936.  C. J. HARTSELL  2,051,336
SEED HARVESTING ATTACHMENT FOR MOWING MACHINES
Filed March 5, 1936  4 Sheets-Sheet 2
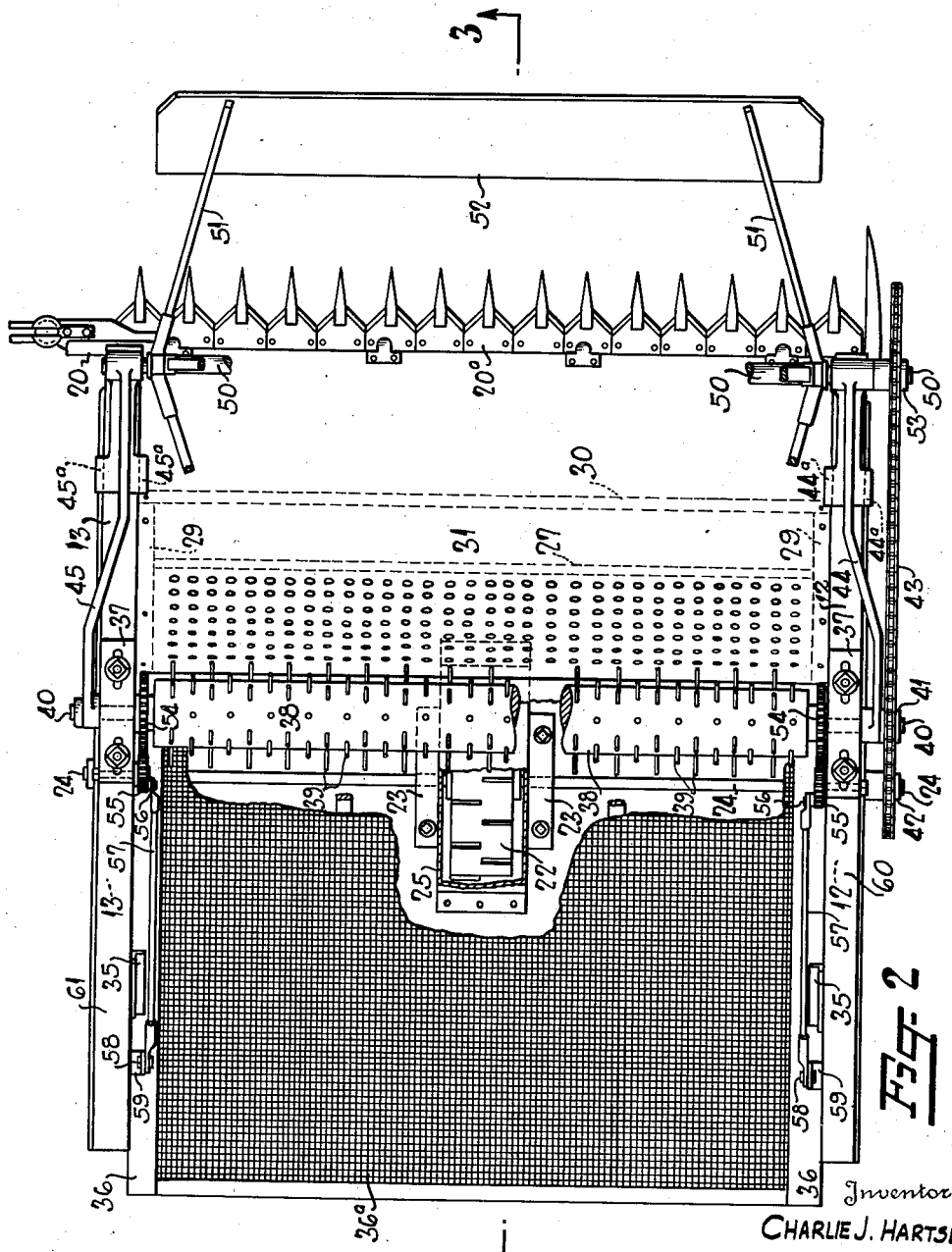
Inventor:
CHARLIE J. HARTSELL
By
Attorney Aug. 18, 1936.　　　　C. J. HARTSELL　　　　2,051,336
SEED HARVESTING ATTACHMENT FOR MOWING MACHINES
Filed March 5, 1936　　　4 Sheets-Sheet 3
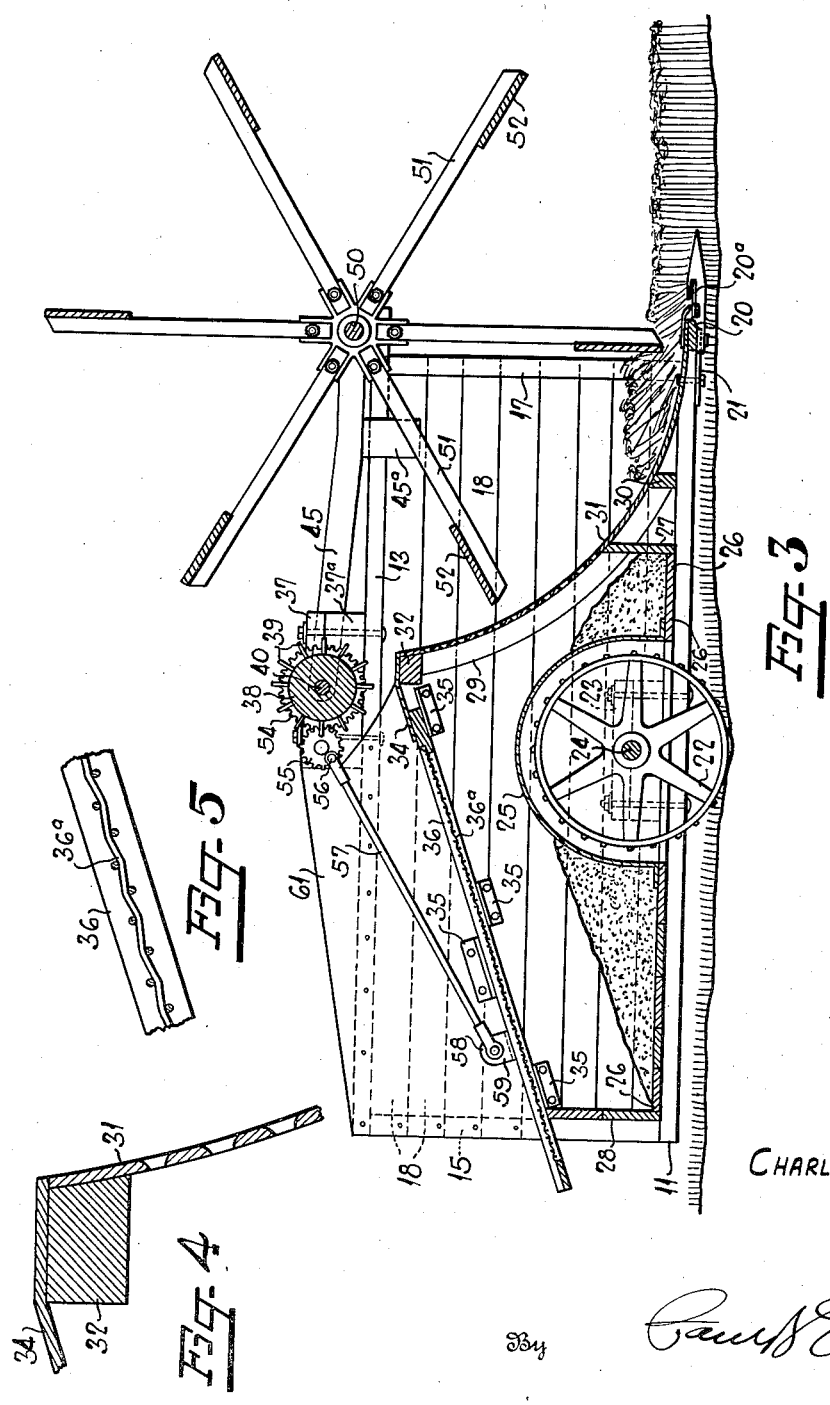
Charlie J. Hartsell
Inventor Aug. 18, 1936.　　　　C. J. HARTSELL　　　　2,051,336
SEED HARVESTING ATTACHMENT FOR MOWING MACHINES
Filed March 5, 1936　　　4 Sheets-Sheet 4
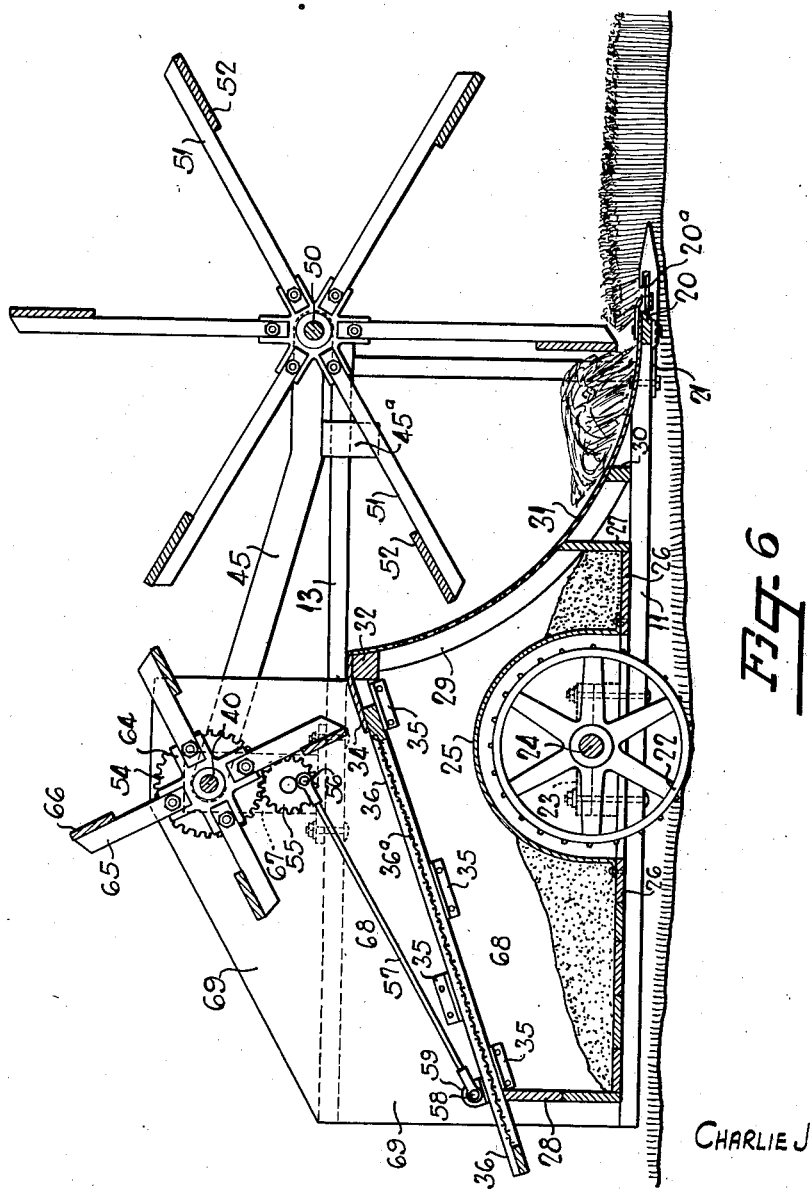
Charlie J. Hartsell
Inventor Patented Aug. 18, 1936

2,051,336

UNITED STATES PATENT OFFICE 2,051,336

SEED HARVESTING ATTACHMENT FOR MOWING MACHINES

Charlie J. Hartsell, Mount Gilead, N. C., assignor of one-half to Lucian I. Strauss, Greensboro, N. C.

Application March 5, 1936, Serial No. 67,331

9 Claims. (Cl. 56—207)

This invention relates to a seed harvester and more especially to a seed harvesting apparatus adapted to be attached to a conventional mowing machine and in which means are provided for passing the cut material over prepared surfaces for extracting therefrom the seed and allowing the clover or other material to pass off the rear of the apparatus and be deposited on the ground in the same manner as if the apparatus were not associated with the sickle of the mowing machine, said apparatus being designed for receiving the seed in a suitable compartment within the apparatus from whence they may be taken and deposited in bags or other suitable containers.

I am aware that heretofore, various devices have been provided for the catching of clover seed after the clover has been cut by the mowing machine, but in the apparatus, I have provided means for raising the cut material upwardly by means of a reel and over a screen and then causing the cut material to pass rearwardly and downwardly over a perforated sheet of material or a screen if desired, and in this manner the seeds are threshed out of the stalks or vegetable matter cut by the sickle and results in the saving of a high percentage of the seed from the cut material.

It is, therefore, an object of this invention to provide an attachment for mowing machines comprising a wheeled framework having a traction wheel from whence power is derived for driving a reel and beater, the reel being adapted to direct the cut material upwardly over a screen and also to prevent the shattered seed from falling in front of the sickle but to cause the seeds to rebound backwardly and to be carried along with the cut vegetation over the screen through which the seeds will drop into the compartment and after leaving the reel the cut material will be engaged by another reel or beater to free the same from the reel and to direct it backwardly over a perforated sheet or screen and to allow the vegetation to fall on the ground in the rear of the framework associated with the sickle of the mowing machine after the seed have been extracted therefrom.

Some of the objects of the invention having been stated, other objects will appear as the description proceeds when taken in connection with the accompanying drawings, in which:—

Figure 1 is a side elevation of my device associated with a sickle of a mowing machine;

Figure 2 is a plan view of the device;

Figure 3 is a longitudinal sectional view taken along the line 3—3 in Figure 2;

Figure 4 is an enlarged sectional view showing a part of the perforated arcuate sheet in the front of the device through which the seeds fall into the seed box;

Figure 5 is an enlarged sectional view showing the screen in the rear of the device;

Figure 6 is a view similar to Figure 3 but showing a reel instead of a toothed cylinder.

Referring more specifically to the drawings, the numerals 10 and 11 indicate the lower longitudinal frame members of my device while 12 and 13 indicate the similar top longitudinal members, and 14 and 15 indicate the rear uprights, while 16 and 17 indicate the front upright members. The members 14, 15, 16 and 17 support a plurality of planks 81 forming side closures for the device, though it is evident that these may be in one sheet of material such as sheet metal if desired. The device is secured to the sickle support 20 of a mowing machine not shown, in any suitable manner such as by means of strips 21 being secured to the lower surface of members 10 and 11 and being secured to the lower side of the sickle. The sickle support has conventional blade 20a slidably mounted therein for cutting the vegetation.

The framework is supported by a traction wheel 22 which is mounted on shaft 24 mounted for rotation in bearing members 23 mounted on the upper side of members 10 and 11 and the floor 26 supported thereby. The shaft 24 extends all the way across the machine. The wheel 22 is housed in a casing 25 and this housing in conjunction with bottom 26, forms a seed receptacle in combination with the upright portions 27 and 28.

Arc-shaped members 29 are secured to a strip 30 and on these arc-shaped members 29 is mounted a plate 31 having its upper surface perforated. The upper ends of members 29 are secured to a cross-piece 32, and also secured to this cross-piece 32 is a bent plate 34 which cooperates with lug angles 35 secured to the sidewalls to form a guideway for screen frame 36 which has secured therein a suitable wire mesh screen 36a through which the seed fall.

Rotatably mounted in suitable members 37 and 37a on top of the members 12 and 13 is a shaft 40 having a toothed cylinder 38 with teeth 39 therein fixedly mounted on said shaft. The shaft 40 has a sprocket wheel 41 mounted on one end thereof and shaft 24 also has a sprocket wheel 42 on the end thereof, both of which sprockets are adapted to receive a sprocket chain 43. The upper longitudinal members 12 and 13 have bearing members 44 and 45 normally resting thereon in which is mounted a shaft 50 which has extending therefrom a plurality of arms 51 on which are mounted blades 52 forming a reel. These bearing members 44 and 45 have downwardly projecting lugs 44a and 45a integral therewith which fit on opposite sides of members 12 and 13 acting as guides for the reel when the same is forced upwardly due to excessive vegetation accumulating above the sickle. The members 44 and 45 are pivoted on the ends of shaft 40 about which the reel pivots when it becomes choked at the sickle thereby preventing breakage of the reel. The shaft 50 has one end thereof, a sprocket wheel 53 over which sprocket chain 43 also passes for driving the same.

Chain 43 also passes over a tightener sprocket 46 which is rotatably mounted on the free end of arm 47, said arm being pivoted as at 47a to the sidewall. This arm has an arcuate slot 48 therein which is penetrated by stud 49 having a wing nut 49a thereon for holding the arms 47 and sprocket 46 in the proper position after the unnecessary slack has been taken out of the chain.

The cut vegetation such as clover and the like passes over perforated plate 31 by being driven therealong by the blades 52 of the reel, and up to the point where it is engaged by cylinder 38 which directs it downwardly and rearwardly over the wire mesh 36a in screen frame 36.

In operation, the device is secured to the sickle bar on a conventional mowing machine in the manner described and the driving wheel 22 is large enough to hold the framework off of the ground at a substantial distance so as to allow it to follow the sickle over varying contours of the ground to prevent the rear end of the framework from dragging on the ground except in extreme depressions of the ground, and of course the size of the wheel may be varied.

The cut material is engaged by the blades of the wheel and whatever seed which may be shattered from the vegetation by the cutting operation, are usually engaged by the blades and knocked backwardly with the vegetation, and this vegetation with the seeds is passed upwardly over the perforated plate 31 and is then engaged by the cylinder 38 which directs the material backwardly and rearwardly over screen 36a and then the cut vegetation falls onto the ground. In passing over wire screen 36a and perforated plate 31, the seeds fall therethrough and are deposited in the seed box from whence they are collected in any suitable manner. The collection of these seeds from the seed box may be effected by raising the frame 36 and removing the seeds from the seed box, or in any other suitable manner.

Mounted on shaft 40 at each end of cylinder 38 is a gear 54 which meshes with an idler pinion 55, said pinion having one end of a link 57 secured thereto as at 56. The other end of the link is pivoted as at 58 to bracket 59 which bracket is secured to frame 36. It is evident that as cylinder 38 turns, rotation will be imparted to pinion 55, which in turn, will deliver oscillatory motion to the screen frame 36 and screen 36a therein. Oscillation of the screen is especially desirable where the contour of the land is not sufficiently rugged to cause the screen to be vibrated otherwise.

Particular attention is called to the form of preparation in the perforated plate 31 which is shown as indentations rather than plain cut perforations so as to cause the seeds to more easily fall therethrough than if the indentations were not present. Therefore, the possibility of the seeds passing entirely over the plate 31 is greatly lessened.

Secured to the sides of the machine are the guards or plates such as sheet metal 60 and 61 which project substantially above the top members 12 and 13.

In Figure 6, I have shown a slightly modified form of the invention which is identical to the structure shown in Figures 1 to 5, with the exception that instead of having a toothed cylinder, I have the hub member 64 mounted on shaft 40 from which projects arms 65 having blades 66 thereon, and shaft 40 is mounted in stands 67. The structure of this reel is similar to the large reel having blades 52 thereon.

Also, instead of having the side portions of my device made of planks, I show it made of pieces of sheet metal 68 which pieces project upwardly on each side as at 69 in lieu of the guards 61 in Figures 2 and 3.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. In a seed harvester, an upwardly and rearwardly projecting perforate member, a downwardly and rearwardly projecting perforate member, positively driven means for moving vegetation over said first perforate member, and other positively driven means for moving said vegetation onto said second perforate member.

2. A clover seed harvester having an upwardly and rearwardly projecting screen, a rearwardly and downwardly projecting screen, a seed compartment beneath said screens, a reel for directing the clover and seed into the harvester, a second reel for directing the clover onto said second mentioned screen, a traction wheel for said harvester, means for driving said reels from said traction wheel and a cutting device at the front end of the harvester.

3. In a seed harvester attachment for mowing machines, a framework, means for attaching the framework to the sickle of a moving machine, a traction wheel mounted in the framework for supporting the screen, an upwardly projecting perforate member in the front portion of the framework, a downwardly and rearwardly projecting perforate member in said framework, a reel mounted in said framework for engaging cut vegetation and moving it over said first mentioned perforate member, a rotatable device mounted in the upper portion of the framework for engaging the vegetation after it is elevated by said reel for directing said vegetation over said second perforate member, a seed compartment beneath said perforate members and means for driving said reel and said rotatable device from said traction wheel.

4. In a seed harvester, an upwardly and rearwardly projecting perforate member, a downwardly and rearwardly projecting perforate member, means for imparting vibration to the downwardly and rearwardly projecting perforate member, positively driven means for moving vegetation over said first perforate member, and other positively driven means for moving said vegetation onto said second perforate member.

5. In a seed harvester, a framework, a cutting device, means for attaching the framework to the cutting device, an arcuately disposed perforate member in said framework, a reel for directing vegetation over said perforate member, a second perforate member, means for imparting vibrations to the second perforate member, rotary means for directing the vegetation onto said second perforate member after it has passed over the first perforate member and a seed compartment disposed below said perforate members.

6. A clover seed harvester having an upwardly and rearwardly projecting screen, a rearwardly and downwardly projecting screen, means for imparting vibratory motion to the rearwardly and downwardly projecting screen, a seed compartment beneath said screens, a reel for directing the clover and seed into the harvester, a second reel for directing the clover onto said second mentioned screen, a traction wheel for said harvester, means for driving said reels from said traction wheel and a cutting device at the front end of the harvester.

7. In a seed harvesting attachment for a mowing machine provided with a sickle, a framework, means for securing the front end of the framework to the sickle of the moving machine, an arcuately disposed screen in the front end of the framework, a reel for directing the cut vegetation over said screen, a rearwardly projecting screen in said framework, means for vibrating said rearwardly projecting screen, means for directing the vegetation over the rearwardly projecting screen, a traction wheel for supporting the framework, means for driving from said traction wheel both said reel and the means for directing the vegetation rearwardly, and a seed receiving compartment disposed beneath said screens.

8. In a machine for harvesting clover seeds and the like, a framework, a cutting device, means for securing the front end of the framework to the cutting device, a traction wheel for supporting the framework, a curved front portion, a screen covering said front portion, a reel having blades adapted to move in close proximity over said curved portion to direct vegetation from the cutting device over said curved portion, a perforated member disposed rearwardly of said screen, rotatable means for receiving the vegetation from said reel and directing it onto said perforated member, means for imparting vibratory motion to said perforated member, a seed compartment disposed beneath said screen and said perforated member, and means for driving said reel and said rotatable member from said traction wheel.

9. In a seed harvester attachment for mowing machines, a framework, means for attaching the framework to the sickle of a mowing machine, a traction wheel mounted in the framework for supporting the screen, an upwardly projecting perforate member in the front portion of the framework, a downwardly and rearwardly projecting perforate member in said framework, means for imparting vibratory motion to the downwardly and rearwardly projecting perforate member, a reel mounted in said framework for engaging cut vegetation and moving it over said first mentioned perforate member, a rotatable device mounted in the upper portion of the framework for engaging the vegetation after it is elevated by said reel for directing said vegetation over said second perforate member, a seed compartment beneath said perforate members and means for driving said reel and said rotatable device from said traction wheel.

CHARLIE J. HARTSELL.